US011777838B2

(12) United States Patent
Sinha

(10) Patent No.: US 11,777,838 B2

(45) Date of Patent: Oct. 3, 2023

(54) SYSTEMS AND METHODS FOR REDUCING BIAS IN MULTICAST REPLICATION SEQUENCE

(71) Applicant: Avago Technologies International Sales Pte. Limited, Singapore (SG)

(72) Inventor: Santanu Sinha, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 28 days.

(21) Appl. No.: 17/390,432

(22) Filed: Jul. 30, 2021

(65) Prior Publication Data

US 2023/0036715 A1 Feb. 2, 2023

(51) Int. Cl.

| | |
|---|---|
| ***H04L 45/16*** | (2022.01) |
| ***H04L 45/00*** | (2022.01) |
| ***H04L 45/42*** | (2022.01) |
| ***H04L 45/745*** | (2022.01) |

(52) U.S. Cl.

CPC .............. *H04L 45/16* (2013.01); *H04L 45/20* (2013.01); *H04L 45/42* (2013.01); *H04L 45/745* (2013.01)

(58) Field of Classification Search

CPC ......... H04L 45/16; H04L 45/20; H04L 45/42; H04L 45/745

See application file for complete search history.

(56) References Cited

U.S. PATENT DOCUMENTS

| | | | | |
|---|---|---|---|---|
| 8,265,059 | B1 * | 9/2012 | Arad | H04L 45/54 370/428 |
| 2004/0264464 | A1 * | 12/2004 | Wong | H04L 12/5601 370/429 |
| 2014/0362854 | A1 * | 12/2014 | Addanki | H04L 49/201 370/390 |
| 2018/0139066 | A1 * | 5/2018 | Nguyen | H04L 49/201 |
| 2018/0173557 | A1 * | 6/2018 | Nakil | H04L 43/0852 |

OTHER PUBLICATIONS

Extended European Search Report on EP 22185445.8 dated Oct. 12, 2022.

* cited by examiner

*Primary Examiner* — Oleg Survillo

*Assistant Examiner* — Monishwar Mohan

(74) *Attorney, Agent, or Firm* — Foley & Lardner LLP

(57) ABSTRACT

A method of reducing bias in multicast replication, the method comprising receiving a packet at a network device and determining a multicast group from the packet. The method further includes obtaining at least two or more destinations corresponding to the multicast group, replicating the packet for the at least two or more destinations, and forwarding the replicated packet to the at least two or more destinations in a randomized sequence.

20 Claims, 14 Drawing Sheets

12
CPU
14
External Devices
10
Network Switch
24
Port 0
Port 1
Port 2
Port n
16
18
20
22

SYSTEMS AND METHODS FOR REDUCING BIAS IN MULTICAST REPLICATION SEQUENCE

FIELD OF THE DISCLOSURE

This disclosure generally relates to systems and methods for distributing messages in a computer network environment, and, more specifically, the disclosure relates to the methods for reducing bias in the distribution of multicast message packets in a network.

BACKGROUND OF THE DISCLOSURE

Switches are hardware components of networks which control the distribution of messages or data packets based on address information contained within each data packet. A data packet can belong to a multicast group which requires the switch to replicate the packet to one or more subscribed destinations. A properly constructed switch can receive a packet on one ingress port and replicate the packet to the appropriate egress port(s) at wire or line speed, which is the maximum speed capability of a particular network.

In recent years as more and more industries rely on high performance computers and networks, a significant advantage can be extracted from minute differences in network speed and packet receipt time. Even though switches operating at line speed are capable of replicating a packet to an egress port once every clock cycle on a nanosecond scale, for multicast packets that must be replicated to multiple egress ports and/or destinations, the delay between replicating the packet to the first destination and replicating the same packet to the last destination may be significant when even just a few nanoseconds is enough to establish a competitive advantage. Specifically, because switching is generally done in a sequential order of destinations that is repeated for each packet in the multicast group, destinations at the beginning of the switching sequence will consistently benefit from a persistent bias packet-to-packet versus destinations at the end of the switching sequence, creating situations where certain ports or positions in a switching sequence are more desirable to end-users than others. In many cases end users will test networks and stress network devices, in order to determine the preferred ports and obtain an advantage over others. Multicast senders, such as financial institutions providing real-time market data to algorithmic traders, may desire systems and methods of multicast switching that reduce the packet switching bias between destinations, thereby removing any incentive for end users to test network equipment or request specific ports in the switching sequence, and ensuring the institution offers consistent service to each customer. Accordingly, there is a need for an efficient method and means for reducing the persistent bias in multicast packet replication between destinations on a switch to ensure the switch is not persistently providing material advantages to one destination over another.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
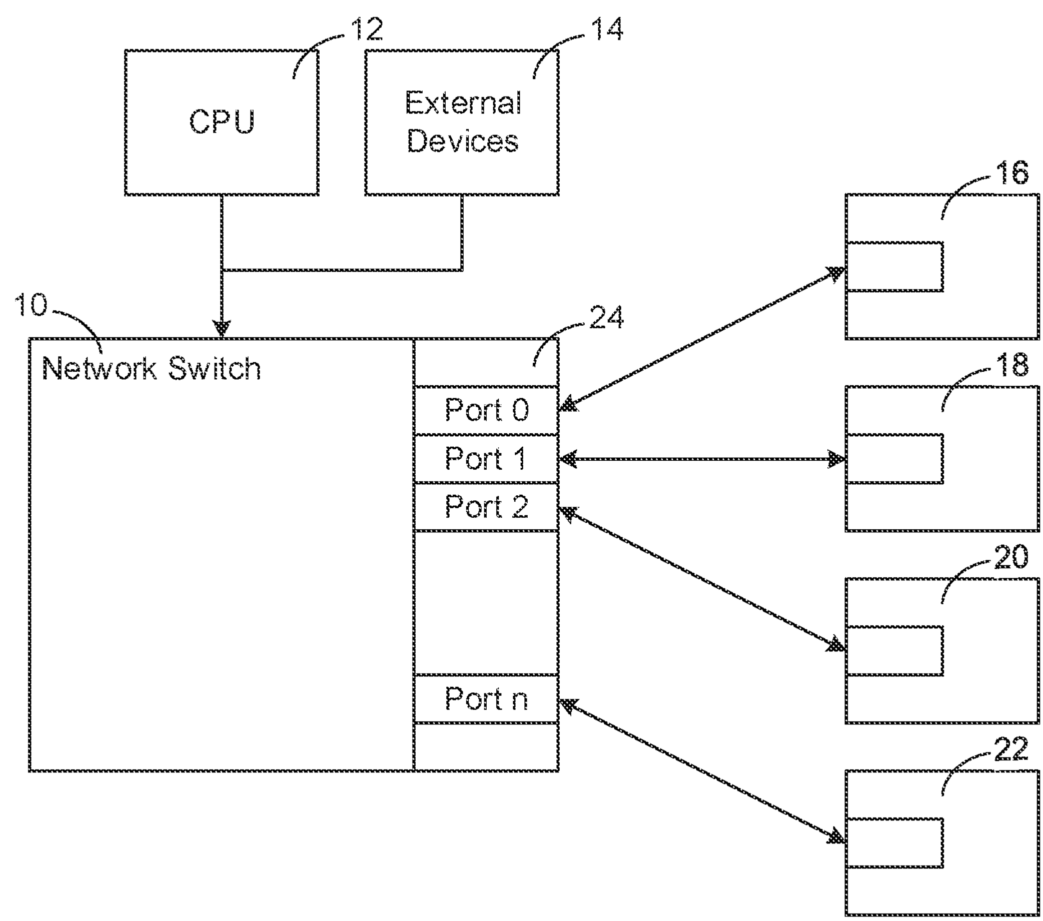
FIG. 1 is a general block diagram depicting a network device within a network.

The details of various embodiments of the methods and systems are set forth in the accompanying drawings and the description below.

DETAILED DESCRIPTION

Some embodiments relate to a method of reducing bias in multicast replication. The method includes receiving a packet at a network device, determining a multicast group from the packet, obtaining at least two or more destinations corresponding to the multicast group, replicating the packet for the at least two or more destinations, and forwarding the replicated packet to the at least two or more designations in a randomized sequence.

In some embodiments, the two destinations are one or more egress ports of the network device. In addition, the step of obtaining at least two or more destinations can include the steps of indexing the multicast group into a lookup table to obtain a port bitmap that corresponds to the multicast group, wherein the port bitmap is a listing of ports of the network device belonging to the multicast group. In some embodiments, the step of forwarding the replicated packet to the at least two or more destinations in a randomized sequence can include randomly selecting an initial destination in the port bitmap, wherein the port bitmap is a circularized bit vector; and forwarding the replicated packet according to the port bitmap starting at the initial destination until the replicated packet has been forwarded to each port in the port bitmap.

In some embodiments, the step of forwarding the replicated packet to the at least two or more destinations in a randomized sequence can include the steps of dividing the port bitmap into one or more replication groups, wherein the one or more replication groups contain a subset of ports of the port bitmap, randomly selecting a first replication group, and forwarding the replicated packet according to the first replication group. In addition, the method can further includes the steps of randomly selecting a second replication group and forwarding the replicated packet according to the second replication group.

In other embodiments, the method can further includes the steps of randomly selecting an initial destination in the first replication group, wherein the first replication group is a circularized bit vector and forwarding the replicated packet according to the first replication group starting at the initial destination. In some embodiments, the method further includes the steps of randomly reordering the listing of ports in the port bitmap, wherein dividing the port bitmap into the one or more replication groups comprises dividing the reordered port bitmap into the one or more replication groups.

In some embodiments, the step of obtaining the at least two or more destinations comprises indexing the multicast group number into a IP routing table to obtain a linked list corresponding to the multicast group, and wherein forwarding the replicated packet to the at least two or more destinations in a randomized sequence comprises forwarding the replicated packet according to the linked list. In some embodiments, the linked list is randomly selected from a plurality of linked list copies corresponding to the multicast group, wherein the plurality of linked list copies are generated from a first linked list corresponding to the multicast group comprising a listing of next hops, and wherein the listing of next hops is randomly reordered in each of the plurality of linked list copies. In some embodiments, the method further includes periodically selecting a linked list copy from the plurality of linked list copies and randomly reordering the listing of next hops in the selected link list copy.

In some embodiments, obtaining the at least two or more destinations includes indexing the multicast group number into a lookup table to obtain a port bitmap that corresponds to the multicast group number, wherein the port bitmap is a listing of ports of the network device belonging to the multicast group. The method also includes indexing the multicast group number into a IP routing table to obtain a linked list of destinations corresponding to the multicast group number, wherein the linked list is randomly selected from a plurality of linked list copies corresponding to the multicast group number, wherein the plurality of linked list copies are generated from a first linked list corresponding to the multicast group number comprising a listing of next hops, and wherein the listing of next hops is randomly reordered in each of the plurality of linked list copies, and wherein forwarding the replicated packet to the at least two or more destinations in a randomized sequence includes dividing the port bitmap into one or more replication groups, wherein the one or more replication groups contain a subset of ports of the port bitmap, randomly selecting a first replication group, forwarding the replicated packet according to the first replication group and forwarding the replicated packet according to the linked list.

Some embodiments relate to a network device for forwarding packets. The device may include an ingress port configured to receive at least a first data packet and a forwarder configured to determine a multicast group from the first data packet, obtain at least two or more destinations corresponding to the multicast group, replicate the first data packet, and forward the replicated packet to the two or more destinations in a randomized sequence through at least one egress port, the egress port based on the two or more destinations. The at least two or more destinations may be a port bitmap corresponding to the multicast group obtained from a lookup table, wherein the port bitmap is a listing of ports of the network device belonging to the multicast group. In some embodiments, the forwarder is configured to forward the replicated packet to the two or more destinations in a randomized sequence by dividing the port bitmap into one or more replication groups, wherein the one or more replication groups contain a subset of ports of the port bitmap, randomly selecting a first replication group, and forward the replicated packet to according to the first replication group.

In some embodiments, the forwarder is configured to index the multicast group number into a IP routing table to obtain the at least two or more destinations, wherein the at least two or more destinations comprise a linked list of destinations corresponding to the multicast group, and the forwarder is further configured to forward the replicated packet according to the linked list. In some embodiments, the forwarder is further configured to periodically select a linked list from the plurality of linked lists copies and randomly reorder the listing of next hops in the selected linked list copy.

In other embodiments, a method of reducing bias in multicast replication is disclosed. The method includes receiving a packet at a network device, determining a multicast group from the packet, obtaining a port bitmap that corresponds to the multicast group, wherein the port bitmap is a listing of ports of the network device belonging to the multicast group. The method further includes randomly forwarding the first packet according to the port bitmap, obtaining a linked list corresponding to the multicast group comprising a listing of next hops, wherein the linked list is randomly selected from a plurality of linked list copies corresponding to the multicast group, and wherein the listing of next hops in each of the plurality of linked list copies is randomly ordered and forwarding the first packet according to the selected link list.

In some embodiments, the method is performed by an integrated circuit. In some embodiments, forwarding the packet according to the port bitmap includes randomly selecting an initial destination in the port bitmap, wherein the port bitmap is a circularized bit vector, and forwarding the replicated packet according to the port bitmap starting at the initial destination until a packet has been forwarded to each port in the port bitmap.

Network Device

FIG. 1 is one example of a configuration of a network device in a network, in accordance with the present invention. The network device may be a hardware-based device such as network switch for moving data packets in a network according to address information contained within the packet itself. In some embodiments, the network device may additionally and/or alternatively perform the function of a router and be configured to move packets in and across networks, or in general any other device configured to move data in or across networks. In addition, although the disclosure may refer at times to a “switch” and “switching,” for the purposes of this invention, the terms “switch” and “switching” may include both switching and routing. The network device in FIG. 1 is shown as network switch 10. Network switch 10 is functionally connected to Central Processing Unit (CPU) 12 and other external devices 14. External devices 14 may be other external processors, external memory, other network devices such as servers, routers, or computers, and/or other network switches to expand the switching capability. CPU 12 can be used to program network switch 10 based on desired rules or protocols for packet processing. Data received from network device(s) 16, 18, 20, and 22 by ports 24 can be processed by network switch 10 independent of CPU 12 based on the programmed instructions. The processed data is then redistributed across the ports 24 to the appropriate network device(s) based on the programmed packet processing rules. The network switch shown in FIG. 1 can be an integrated, modular, single chip solution. In some embodiments, network switch 10 includes an application-specific integrated circuit (ASIC) constructed according to the packet processing rules, a field programmable gate array (FPGA), or any other type and form of dedicated silicon logic or processing circuitry capable of processing and switching packets. Additionally and/or alternatively, network switch 10 can be a plurality of individual components on a circuit board, or implemented on a general purpose device, or general purpose devices, through software.

Still referring to FIG. 1, in forwarding a multicast packet the network switch 10 can receive the multicast packet from the network device(s) 16, 18, 20, and 22 and process the packet. While the word "packet" is used, it should be understood that the disclosed process can work with other types of data including cells, frames, datagrams, bridge protocol data unit packets, packet data, etc. Packet processing can include reading, modifying, and classifying the packet, changing the packet forwarding behavior, removing and/or appending information to the packet, mirroring the packet to another port, storing the packet in a buffer, reordering the packet in a series of packets, sending the packet to a service queue, or changing the type of packet. For example, network switch 10 can replicate the packet and choose port 2 as the egress port, which can thereafter forward the packet to network switch 10. The egress port and final network device destination are determined by data contained in the packet. In Layer 2 (L2) forwarding a packet is switched within a network to one or more egress ports of the network switch. In L3 forwarding a packet can be replicated and sent to multiple destinations on a single egress port or across multiple egress ports. In some embodiments, the final packet destination is a successive network device, and the packet is forwarded from network switch 10 through a series of network devices before the final destination is reached.

The packet contains information for replicating and forwarding the packet to the appropriate destinations on the network. A packet is originally received on a source port noted by network switch 10 and it can then be replicated and forwarded to the same or one or more other ports that belong to the multicast group indicated by the information contained in the packet. The multicast group can be indexed against a forwarding table (L2) or IP routing table (L3) to obtain a listing of destinations subscribed to the multicast group. In multicast, packets tagged as belonging to a multicast group are sent to subscribed destinations that have indicated to network switch 10 that they belong to the multicast group. The single packet can be replicated and forwarded to a plurality of destinations without flooding the network, such that only a single packet is transmitted to each destination.

Layer 2 Replication

The packet can be switched, bridged, or forwarded based on the destination MAC address contained in the packet. If the packet indicates that the VLAN ID of the packet is the same as the VLAN ID of the source, then it is forwarded according to Layer-2 values of the packet. Intra-network switching based on MAC address information is called Layer 2 (L2) forwarding because it operates on the data link layer (OSI Layer 2). In L2 forwarding, network switch 10 can use the multicast group number and reference a lookup table (i.e., a forwarding table) to obtain the list of destinations indexed for the multicast group. In some embodiments, the destination list may be a binary port bitmap vector of all ports in network switch 10 that are subscribed to that multicast group. Still in other embodiments, the list may be a binary port bitmap vector of all ports in network switch 10 with the value of each vector position indicating if the port is enabled or disabled. The port bitmap vector can be of any length, such as 64 bits in length. An example lookup table for indexing multicast group numbers (MCGNs) and port bitmap vectors is included below:

TABLE 1

| MCGN | Port Bitmap Vector |
|---|---|
| 0 | 1 0 0 1 1 0 1 0 1 0 1 1 0 1 1 0 0 1 0 1 1 |
| 1 | 1 0 0 1 1 1 0 0 1 1 0 0 1 1 1 0 0 0 0 0 1 |
| . . . | . . . |
| n | 0 1 1 0 1 1 0 1 1 0 0 0 0 1 0 1 1 0 1 1 0 |

In the port bitmap vector shown in Table 1, each value in the vector represents a port; an enabled port can be marked by a "1" and a disabled port can be marked by a "0." In some embodiments, the port bitmap vector lists only those ports that are a member of the multicast replication group. The packet is then replicated to each port in the vector. The port bitmap vector can also be a value represented in various other format. In some embodiments, the destinations list may include a list of MAC addresses for devices subscribed to the multicast group, and network switch 10 may then replicate the packet to the MAC address over the appropriate ports. The network switch 10 may reference a MAC address table to find the appropriate egress port corresponding to the destination MAC address. The MAC address table is built by network switch 10 using the source address of packets that are received. If the MAC address for the destination is not found, network switch 10 will flood the packet to all ports except the source port to ensure it reaches the appropriate destination. The destination then replies, and its MAC address is added to the table for future forwarding. If the MAC address of the destination is already known, network switch 10 sends the packet to the appropriate destination MAC address through the correct port determined from the MAC address table. It can also be built through various communication protocols designed to discover link layer addresses, such as Internet Group Management Protocol (IGMP) Snooping. The same information can be used to develop the port bitmap vector indexed according to multicast group number.

Figure 2:
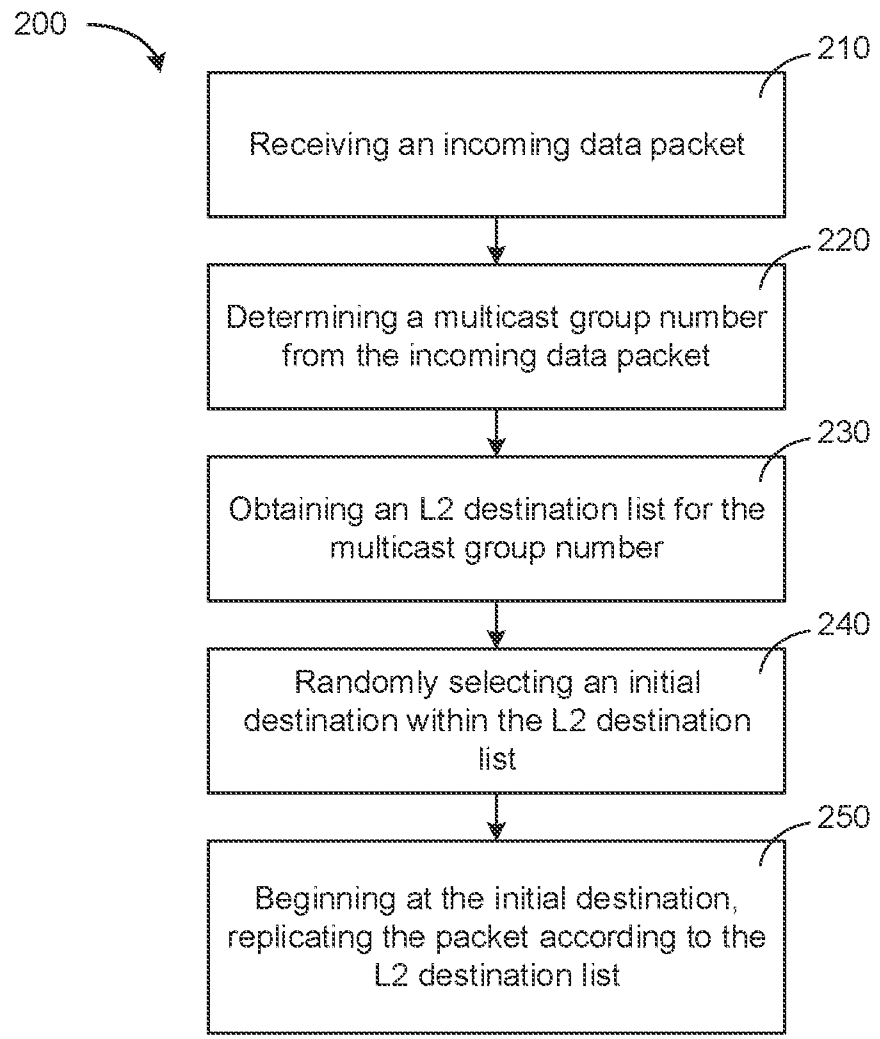
FIG. 2 is a flow chart illustrating one method of reducing bias in Layer 2 (L2) multicast replication, according to an exemplary embodiment.

FIG. 2 is a flow chart illustrating process 200 for reducing bias in L2 multicast replication, according to one embodiment of the present invention. Process 200 can be performed by one or more network devices. For example, process 200 can be performed by network switch 10 and/or hardware contained within it, such as an ASIC chip. In step 210, a data packet is received, and in step 220 the data packet is processed to retrieve a multicast group number. In step 230 the L2 destination list corresponding to the multicast group number is obtained. The destination list may, for example, be a port bitmap such as a bit vector, or listing of MAC addresses as described individually above. The L2 destination list may be circularized such that it has no end and each destination in the list is connected to two others to form a circle, with what would be the end value pointing back to the first value. For example the L2 destination list may be a circularized bit vector of n ports. The $n^{th}$ port points to the first port such that the bit vector is circularized, and no matter the starting port, proceeding sequentially through the circularized bit vector each port will be passed. The multicast group number may be indexed in a lookup table such as Table 1 and used to obtain the corresponding destination list, in Table 1 a port bitmap vector.

In step 240, the process includes randomly selecting an initial destination within the L2 destination list. For example, the network switch may use a random number generator to select a port in the port bitmap vector as a starting point for forwarding the packet. This results in a randomized sequence of ports or destinations as compared to the initial port bitmap vector. While the term random is used, for the purposes of this invention random includes both random and pseudo-random. For example, the randomly selected initial destination may be a pseudo-randomly selected initial destination, the random number generator may be a pseudo-random number generator, and the randomized sequence may be a pseudo-randomized sequence. The process shown in step 240 uses the randomly selected initial destination to randomize the replication process, ensuring that from one packet to the next a port is not favored over another port such that a bias is introduced into the replication process. In step 250, beginning at the initial destination, the packet is replicated according to the circularized L2 destination list. As described above, the circularized list ensures each destination in the list will receive a packet no matter the starting point. According to the exemplary embodiment shown in FIG. 2, replication proceeds sequentially along the circularized L2 destination list, starting from the initial destination, to the end of the list, and then moving back to the beginning of the list until a packet has been replicated to each destination.

Figure 3:
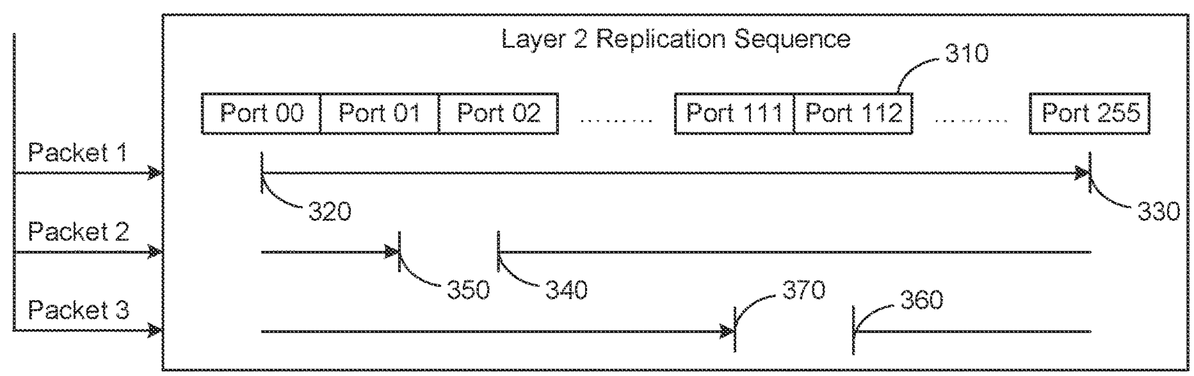
FIG. 3 depicts packet handling according to one example of a method of reducing bias in L2 multicast replication.

FIG. 3 is an example of packet handling in process 200 of FIG. 2 for multiple packets, according to an exemplary embodiment. The destination list from process 200 is shown as port bitmap vector 310, which includes a listing of 256 ports, Port 00-Port 255. While shown to include 256 ports, the port bitmap vector may be of any length and/or size according to how many ports are a member of the multicast group. In the example shown in FIG. 3, Port 00 is randomly selected as the starting point 320, and packet 1 is replicated to each port in the vector, beginning at starting point 320 and ending at port 255, or end point 330. A random (i.e., random or pseudo-random) starting point 340 is selected for packet 2 at port 02, and packet 2 is likewise replicated to each port in port bitmap vector 310. The port bitmap vector is circularized such that at port 255, because packet 2 has not been replicated to each port in the port bitmap vector, the replication process returns to port 00 and continues replicating packet 2 until it has been replicated to each destination port until the end point 350 at port 01. Likewise, the randomly selected starting point 360 for packet 3 replication is at port 112, and packet 3 is replicated from port 112 through port 255, then back to port 00 and up to the end point 370 at port 111, such that it is replicated to all ports in the vector. In another embodiment, the port bit map may include all ports of network switch 10 and indicate instead which ports are subscribed and which ports are not subscribed to the multicast group, and the packet will only be replicated to the subscribed ports. As shown in FIG. 3, when the next packet in the multicast group is received, process 200 is repeated, and another starting point is randomly selected in the L2 destination list. The starting point may or may not be the same starting point as the last packet in the multicast group, and by introducing a random or pseudo-random starting point, process 200 minimizes the bias in the L2 multicast replication such that a favored port for a given data packet cannot be reasonably predicted.

For example, it may take one clock cycle to replicate a packet to each port. With a clock cycle of 1 ns, port 00 will receive packet 1 256 ns before port 255. If the replication sequence always begins at port 00, port 00 will have a persistent bias over port 255 such that it will always receive data 256 ns sooner. Referring back to FIGS. 2 and 3, randomly selecting a start point in step 240 distributes the bias packet-to-packet, such that it cannot be reasonably predicted which port will receive the packet first, effectively eliminating the bias.

Figure 4:
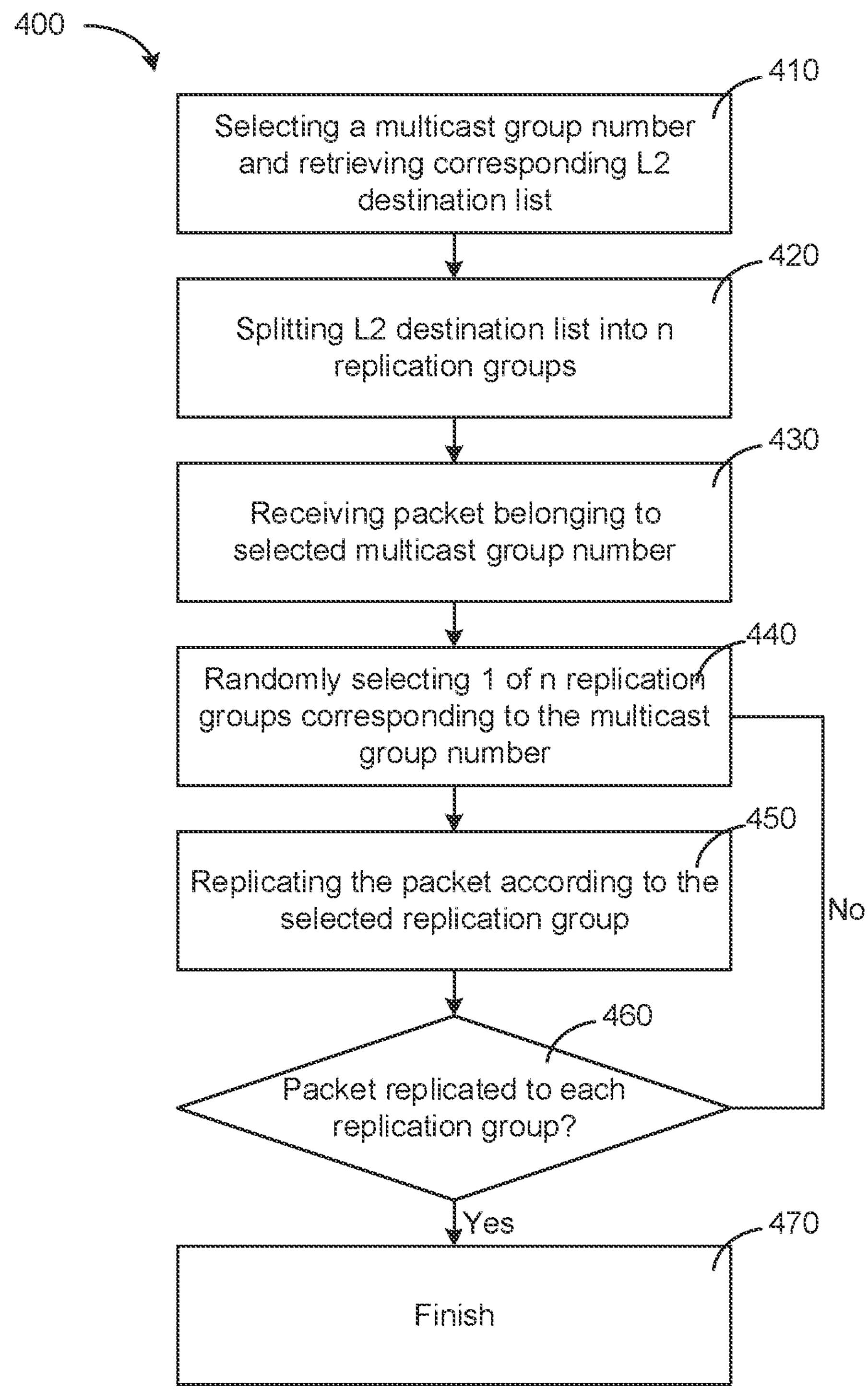
FIG. 4 is a flow chart illustrating a second method of reducing bias in L2 multicast replication, according to an exemplary embodiment.
Figure 5A:
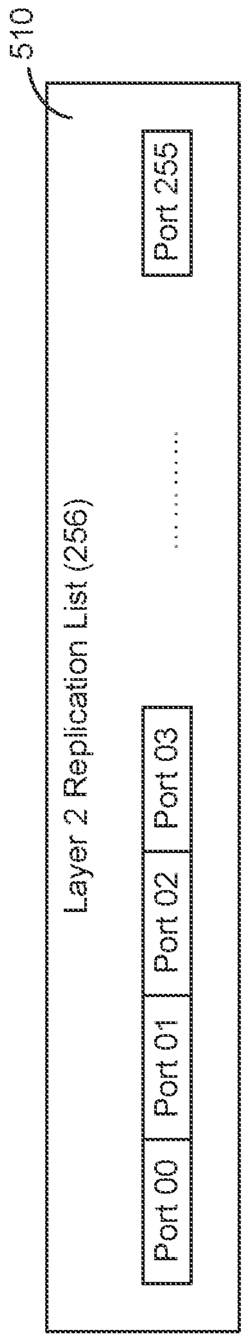
FIG. 5A depicts a multicast port bitmap, according to an exemplary embodiment.
Figure 5B:
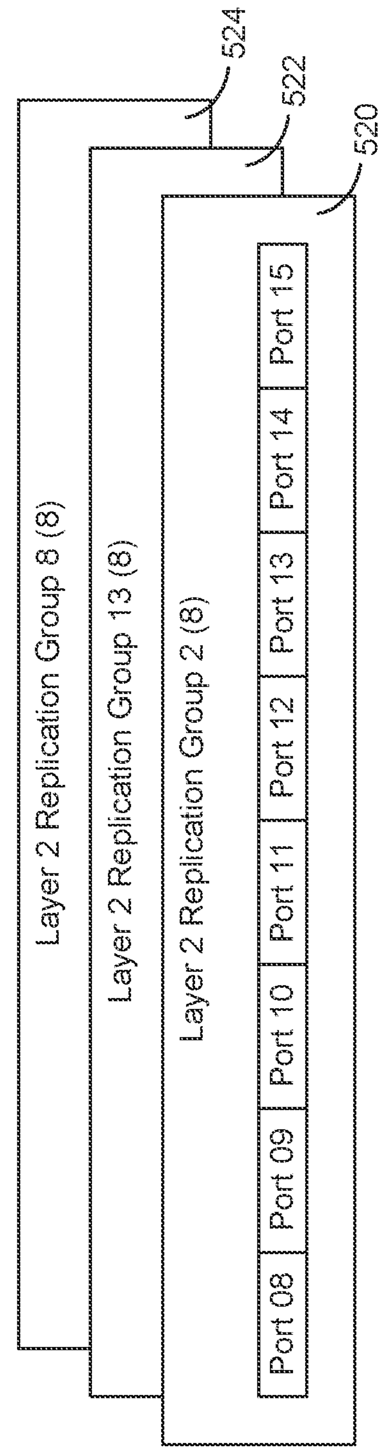
FIG. 5B depicts exemplary multicast replication groups for use in the method depicted in FIG. 4.

FIG. 4 is a flow chart illustrating process 400 for reducing bias in L2 multicast replication, according to another embodiment of the present invention. Process 400 can be performed by one or more network devices. For example, process 400 can be performed by hardware in network switch 10. Process 400 is shown to include step 410, selecting a multicast group number and retrieving a corresponding L2 destination list. An example destination list is shown in FIG. 5A as a port bitmap vector. While port bitmap vector 510 is shown in sequential order, in some embodiments not all 256 ports of a network switch are included. In some embodiments, port bitmap vector 510 may include fewer ports if not all ports are subscribed to the multicast group. Referring back to FIG. 4, step 420 includes splitting the L2 destination list into n number of replication groups. Hardware such as ASIC(s) inside of network switch 10 may perform the split in some embodiments. The destination list may be split into any number of groups. Each group can contain a unique subset of destinations included in the destination list, such that together the groups include all destinations in the L2 destination list. The groups may be of equal or dissimilar sizes. For example, referring now to FIG. 5B, each replication group 520, 522, and 524 contains 8 ports of a 256 port bitmap vector. Continuing the example, there would be a total 32 replications to ensure each destination is included.

Referring back to FIG. 4, in step 430, process 400 is shown receiving a packet belonging to the selected multicast group number. In some embodiments, step 430 may occur before step 410, such that the multicast group number selected in step 410 is derived from the received packet. In step 440, process 400 is shown randomly selecting one of the n replication groups corresponding to the multicast group number of the packet and replicating the packet to the destinations listed in the replication group at step 450. At step 460, if the packet has not been replicated to each replication group corresponding to the multicast group number, process 400 returns to step 440 and randomly selects another replication group from the remaining pool of replication groups. In multicast replication each destination receives one copy of the packet, so each group is selected once. If the packet has been replicated to each replication group, the replication process for the packet is finished at step 470.

Figure 6:
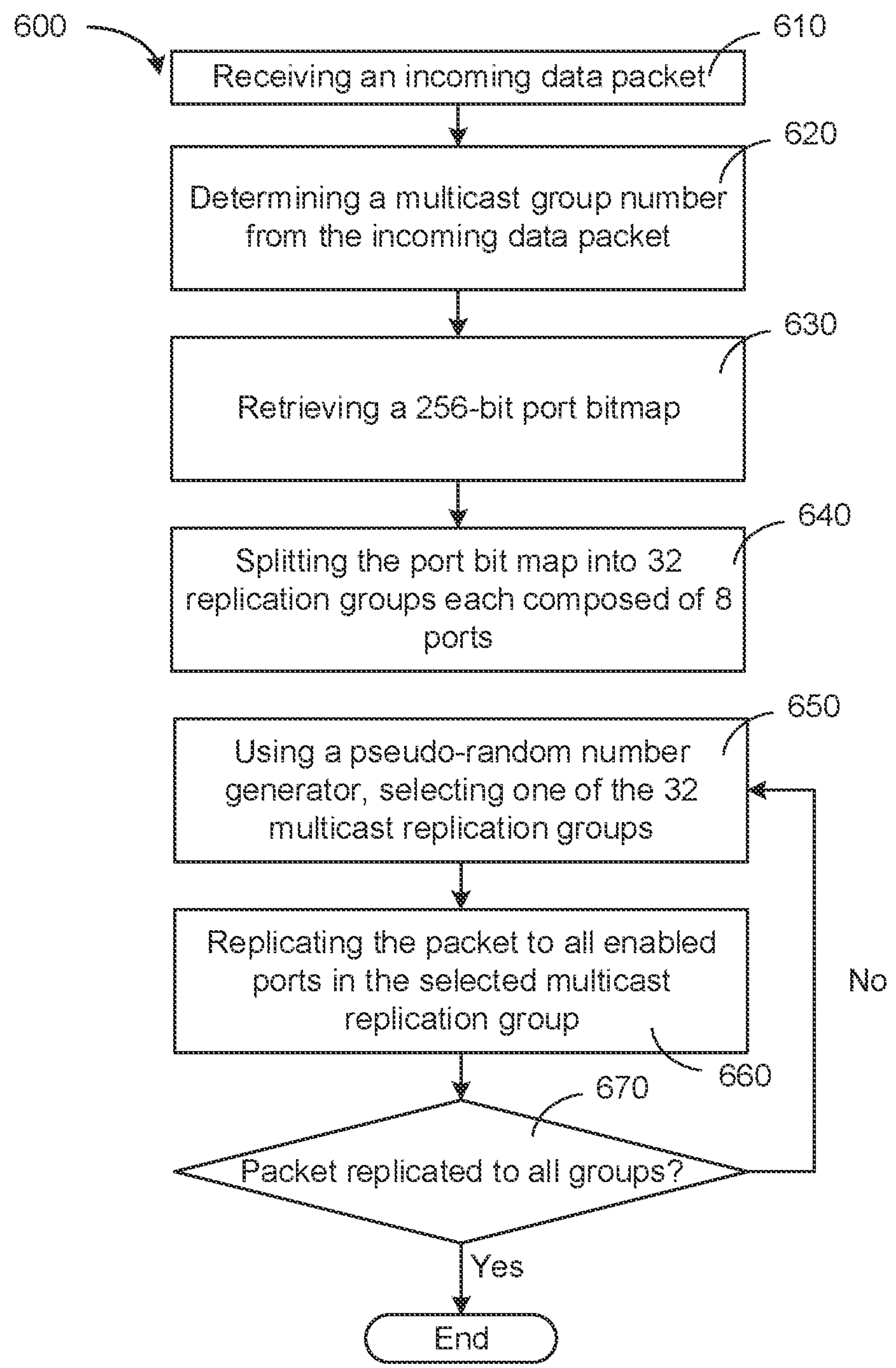
FIG. 6 is a flow chart depicting one example of the second method of reducing bias in L2 multicast replication.

FIG. 6 is a flow chart of an example of process 400, shown as process 600. Process 600 can be performed by one or more network devices. For example, process 600 can be performed by hardware in network switch 10. Step 610 in process 600 includes receiving an incoming data packet.

Step 610 may be the same and/or similar to 430. Unlike process 400, process 600 is shown to include receiving the multicast packet first. In some embodiments process 600 is similar to process 400 and the packet is not received until after the splitting process.

At step 620 the incoming data packet is processed and its multicast group number is determined. The multicast group number is indexed in a lookup table such as Table 1 to retrieve the destination list, described in step 630 as the 256-bit port bitmap. The multicast group number may be used to obtain the destination list in accordance with any other networking protocol for L2 switching. Once the port bitmap is retrieved, step 640 includes splitting the port bitmap into 32 replication groups composed of 8 ports each. While shown as 32 groups of 8, the port bitmap may be split into any number and size of replication groups. The replication groups may be split and stored in hardware so that packet switching may still be accomplished at wire speed. As discussed above, in some embodiments the replication groups for a given multicast group may be split before a multicast packet is received belonging to the multicast group. In such an embodiment the replication groups need only be created once, and they may then be used for more than one packet in the multicast group.

Using a pseudo-random number generator, step 650 includes selecting one of the 32 replication groups corresponding to the packet multicast group number. In a manner similar to process 200, randomly or pseudo-randomly selecting the order of replication groups introduces randomness in the L2 switching sequence and eliminates bias from one port to another. Once a replication group is selected, the packet is replicated to all enabled ports in the replication group at step 660. In some embodiments, the packet is replicated to all ports in the replication group. At step 670, process 600 checks if the packet has been replicated once to each replication group. If the answer is no, process 600 reverts to step 650 and a remaining group is again selected with a pseudo-random number generator. If the answer is yes, process 600 ends the replication sequence for the packet.

Figure 7:
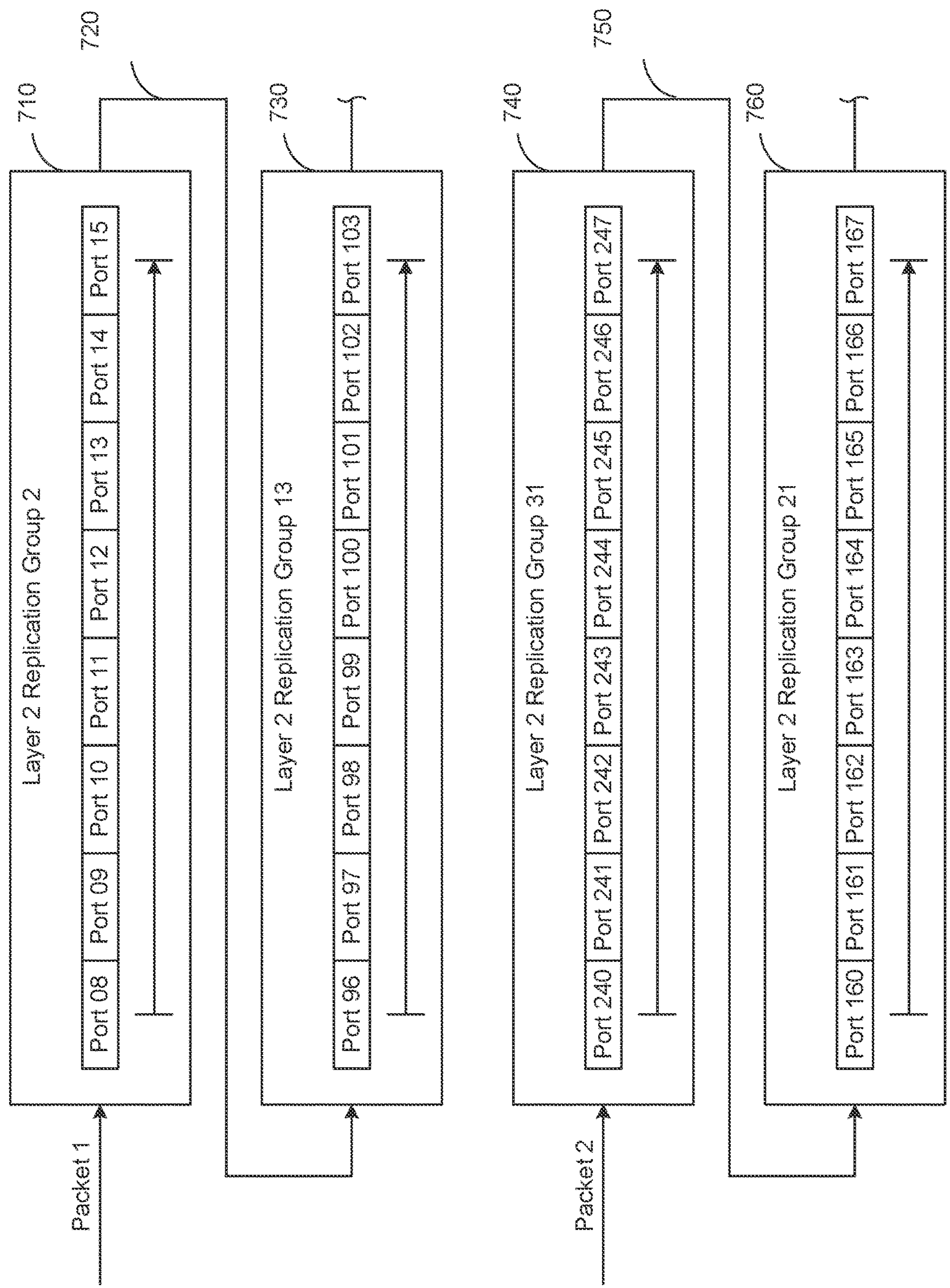
FIG. 7 depicts packet handling according to the second method of reducing bias in L2 multicast replication, according to an exemplary embodiment.

FIG. 7 is an example of packet switching in process 600, according to the present invention. Packet 1 is shown being replicated to replication group 710, shown as Layer 2 Replication Group 2, starting at port 08 and ending at port 15, before proceeding at 720 to replication group 730, shown as Layer 2 Replication Group 13, and being replicated starting at port 104 and proceeding to port 111. The above continues until packet 1 has been replicated to each replication group.

FIG. 7 also shows packet processing for Packet 2 of the same multicast group. According to process 600 a replication group is randomly selected using a pseudo-random number generator. In the example shown in FIG. 7, packet 2 is replicated first to replication group 740, shown as Layer 2 Replication Group 31, starting at port 240 through port 247, and then at 750 another replication group is randomly selected, and Packet 2 is replicated on port 160 through port 167 of replication group 760, shown as Layer 2 Replication Group 21. The process continues until packet 2 has been replicated to each replication group.

Figure 8:
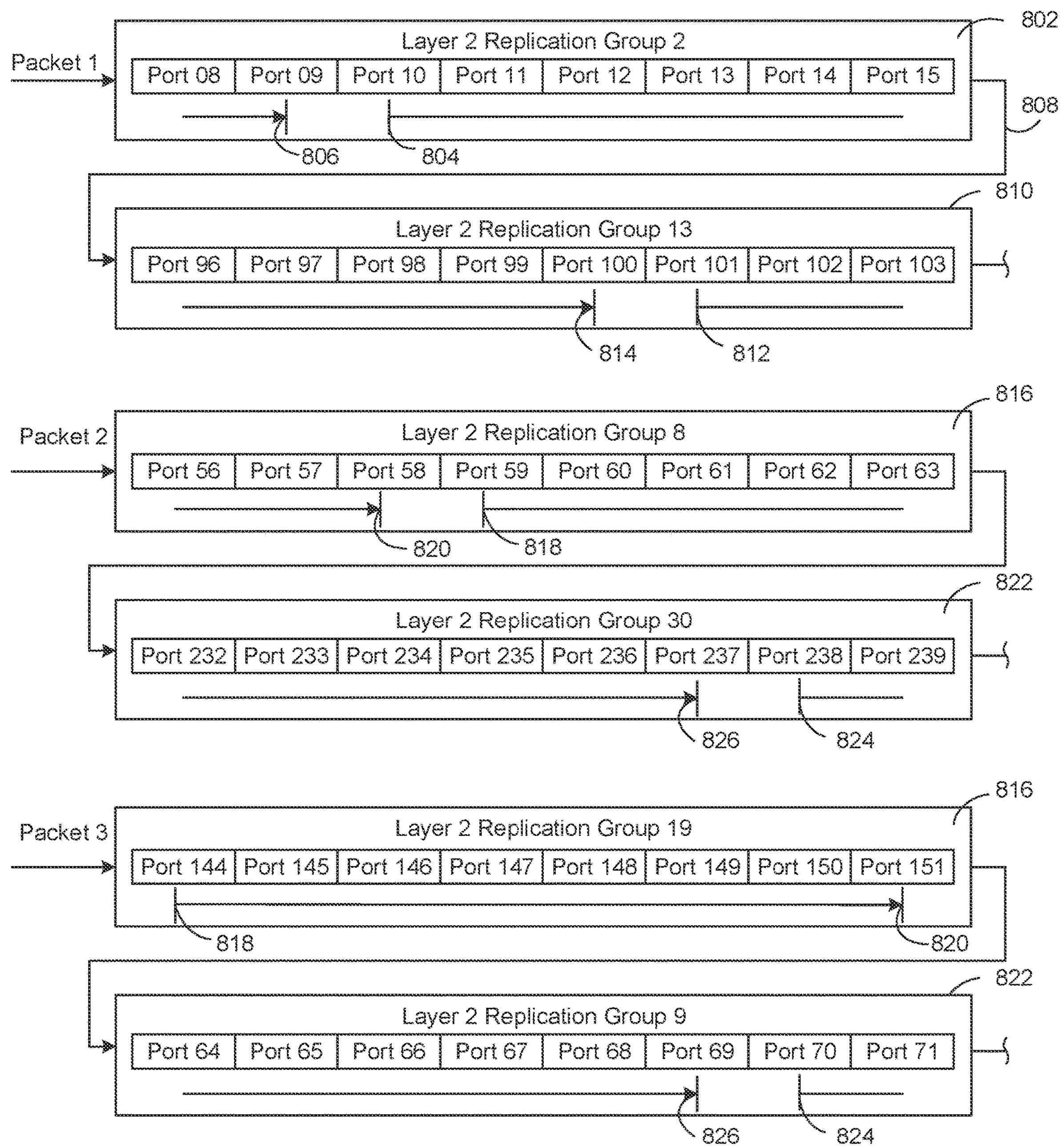
FIG. 8 depicts packet handling according to a third method of reducing bias in L2 multicast replication, according to an exemplary embodiment.

In FIG. 7, the packet is replicated in a replication group to each port sequentially. Therefore, randomly selecting the groups only minimizes inter-group bias, and intra-group bias may still exist. For example, referring back to replication group 710 in FIG. 7, port 08 will always receive the packet before port 15, no matter when the group is chosen. In some embodiments, the intra-group bias may be eliminated by periodically updating the groups, additionally and/or alternatively alternating their size and number. Referring now to FIG. 8, an example of the packet switching process 600 with an additional step of randomization for eliminating intra-group bias is shown. In FIG. 8, the packet replicated and/or forwarding process within a group is varied by randomly selecting a start position within a group. Using a pseudo-random or random number generator, a random initial destination is selected within replication group 802, shown as Layer 2 Replication Group 2. Starting at randomly selected initial destination 804, packet 1 is replicated to port 10 through port 15, then port 08 and port 09, end point 806. Like the destination list in process 200, the port bitmap vector of 8 ports in replication group 802 is circularized such that no matter the initial starting point, each destination receives a packet. Using a pseudo-random number generator at 808, another replication group corresponding to the multicast group of packet 1 is chosen, shown as replication group 810. The pseudo-random number generator is also used to choose a random initial destination, shown as initial destination 812. Packet 1 is then replicated in the same manner as it was replicated for replication group 802. The process continues until packet 1 has been replicated to each replication group. Packet 2 is then processed by the network switch. Like packet 1, a random replication group corresponding to the multicast group number is selected, shown as replication group 816. Start point 818 is randomly selected within the group and packet 2 is replicated along the circularized vector until it has been replicated to each destination. Another group is randomly selected, shown as replication group 822, and again, starting at random start point 824, packet 2 is replicated along the circularized vector. The process continues until packet 2 has been replicated to each replication group. The process is the same for packet 3.

Figure 9:
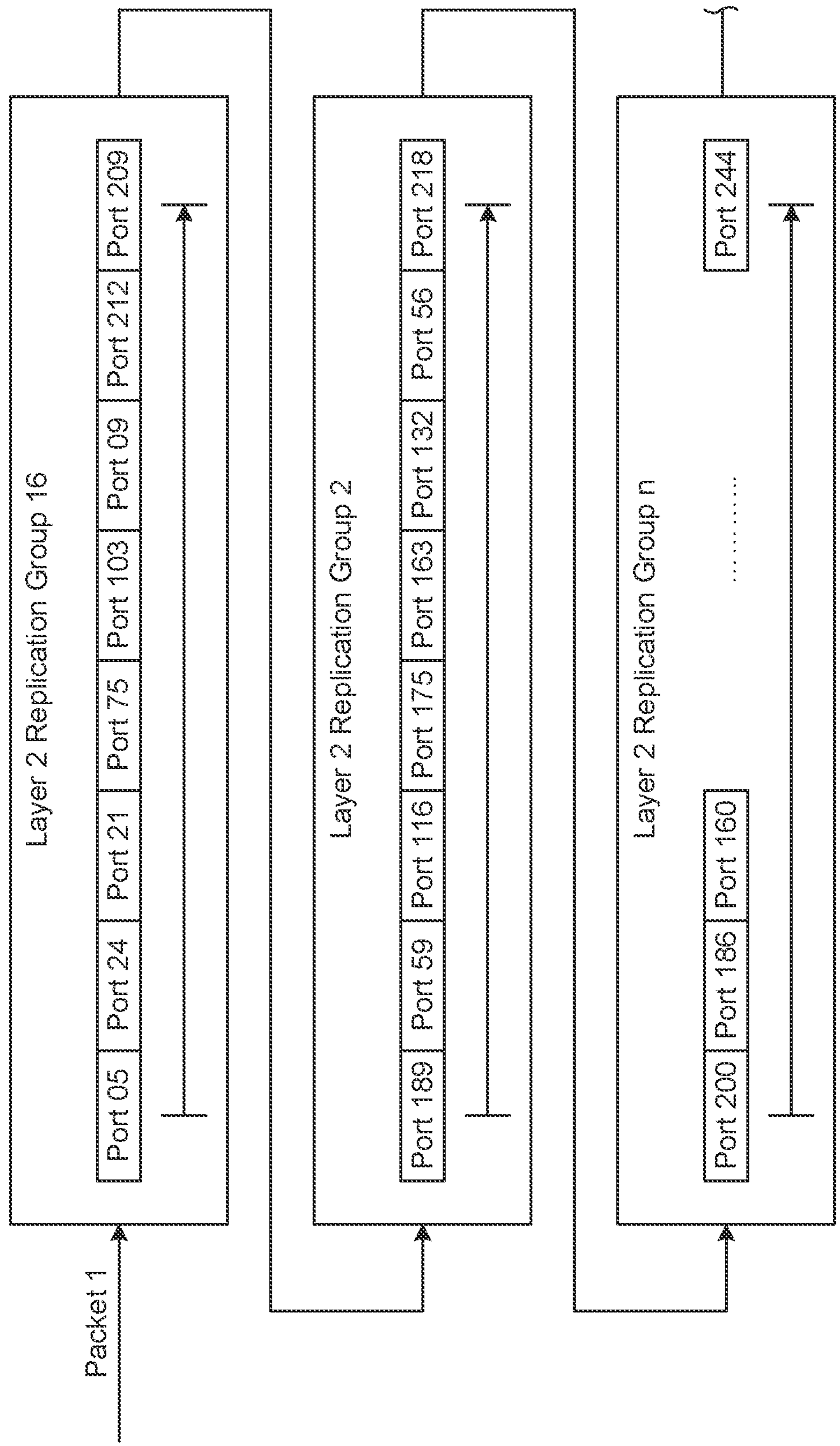
FIG. 9 depicts packet handling according to a fourth method of reducing bias in a L2 multicast replication, according to an exemplary embodiment.

FIG. 9 is another example of the packet switching process 600 with an additional step of randomization, according to another embodiment of the present invention. In FIG. 9, the random/pseudo-random number generator is used to randomly reorder the sequence of the destination list before it is split in replication groups. Each replication group accordingly contains a random selection of destinations from the port bitmap. Process 600 then carries on as described above with reference to FIG. 6, except that each group now contains a random assortment of destinations from the initial destination list.

Layer 3 Replication

The packet can also be switched, bridged, forwarded, and routed based on the destination IP address contained in the packet across networks in Layer 3 (L3) multicast switching. The network device 10 can perform the L3 multicast switching (i.e., switching and/or routing) in hardware. For example, the network device 10 can use an ASIC to perform L3 switching at line speed. Network switch 10 processes the packet and retrieves the multicast group number, which is used to obtain a destination list corresponding to the multicast group number. The destination list may be a linked list, including for example a series of next hops or a combination VLAN and port bitmap vector, etc.

L3 multicast uses a multicast routing protocol to establish the linked lists. The network switch 10 can use various multicast routing protocols including but not limited to Internet Group Management Protocol (IGMP), Protocol Independent Multicast-Sparse Mode (PIM-SM), Protocol Independent Multicast-Dense Mode (PIM-DM), etc. In L3 multicast a single packet may be routed across networks as needed. For instance, if a single egress port contains multiple destinations, the packet can be replicated as many times as necessary to send to all domains in the Virtual Local Area Network (VLAN) associated with the egress port, as well as replicated to all other destinations, including VLANs that subscribe to the multicast group.

Figure 10:
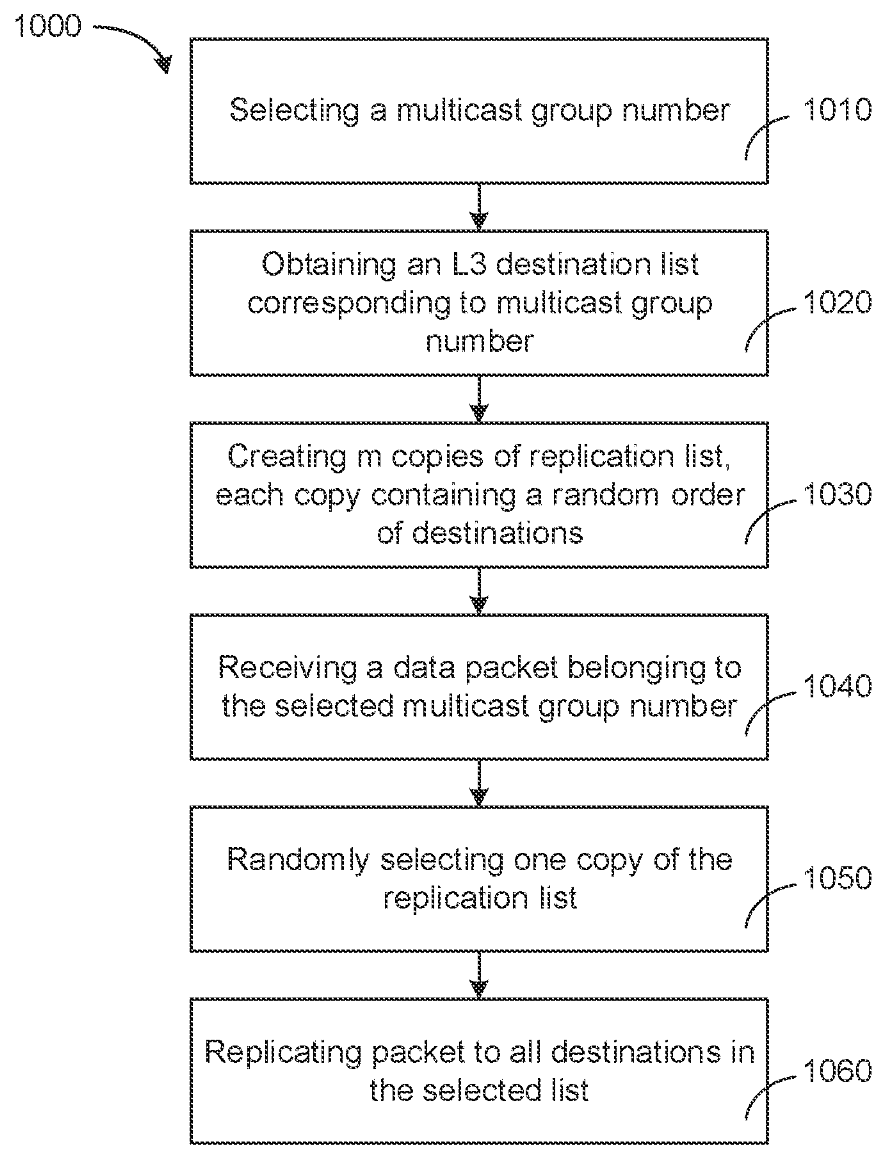
FIG. 10 is a flow chart illustrating one method of reducing bias in L2 or Layer 3 (L3) multicast replication, according to an exemplary embodiment.

FIG. 10 is a flow chart illustrating process 1000 for reducing bias in L3 multicast replication, according to one embodiment of the present invention. Process 1000 can be performed by one or more network devices. For example, process 1000 can be performed by network switch 10 and/or hardware contained within it such as an ASIC chip. Process 1000 can be performed additionally and/or alternatively with processes 200, 400, and/or 600 in order to reduce bias in both L2 and L3 switching for a multicast packet. Like processes 200, 400, and 600, process 1000 is fundamentally concerned with introducing randomness in multicast replication sequencing to eliminate the bias from one destination to another.

Process 1000 is shown to include selecting a multicast group number in step 1010. In some embodiments, the multicast group number is determined by examining an incoming multicast packet. In other embodiments, the network switch periodically selects multicast group numbers for process 1000. Step 1020 includes obtaining an L3 destination list corresponding to the multicast group. The L3 destination list may be a linked list or replication group, for example a linked list including a series of next hops. In some embodiments, the linked list additionally and/or alternatively contains a series of {VLAN, port bitmap} vectors representing destinations. The linked list may be obtained by indexing the multicast group number in a lookup table to obtain a replication group. The replication group may obtain a replication list (i.e., a linked list) containing a series of next hops and/or a port bitmap vector. The lookup tables may be L3 IP routing tables formed by routing protocols such as Internet Group Management Protocol (IGMP), Protocol Independent Multicast-Sparse Mode (PIM-SM), Protocol Independent Multicast-Dense Mode (PIM-DM), etc.

Process 1000 is shown to include step 1030 including creating m copies of the replication lists (i.e., linked lists), wherein each copy contains a random order of destinations. Using a random number generator, software contained in a network switch can randomly reorder the sequence of destinations in each copy of the destination lists. While the term randomly reorder is used, as discussed above for the purposes of this disclosure random includes random and pseudo-random, such that a randomly reordered sequence of destinations may be a randomly or only a pseudo-randomly reordered sequence of destinations. Any number of replication list copies may be created for example, $2^n$, where n is configurable by software. Each replication list copy will have the same destinations but the order of the destinations will be randomized.

While process 1000 is described above in relation to L3 multicast replication, it may also be applied to L2 replication. In L2 replication, each destination belongs to the same network, thus the {VLAN, port} linked list includes various destinations only across ports of a network switch. For successful L2 replication step 1030 may therefore include randomizing the order of ports in the {VLAN, port} linked list to obtain m copies of the linked list per multicast group, each with a difference sequence of ports in the list but the same VLAN value corresponding to the L2 domain.

When a multicast packet in the multicast group is received as in step 1040, one of the $2^n$ replication list copies corresponding to that multicast group is randomly selected in step 1050. Step 1060 includes replicating the packet to all destinations in the replication list. Steps 1040-1060 can take place in hardware in a network switch such that replication can occur at wire speed. The process will repeat for each individual packet in a multicast group, so the packets will be replicated to next hops in different orders. This reduces short term bias in the L3 replication sequence.

Figure 11:
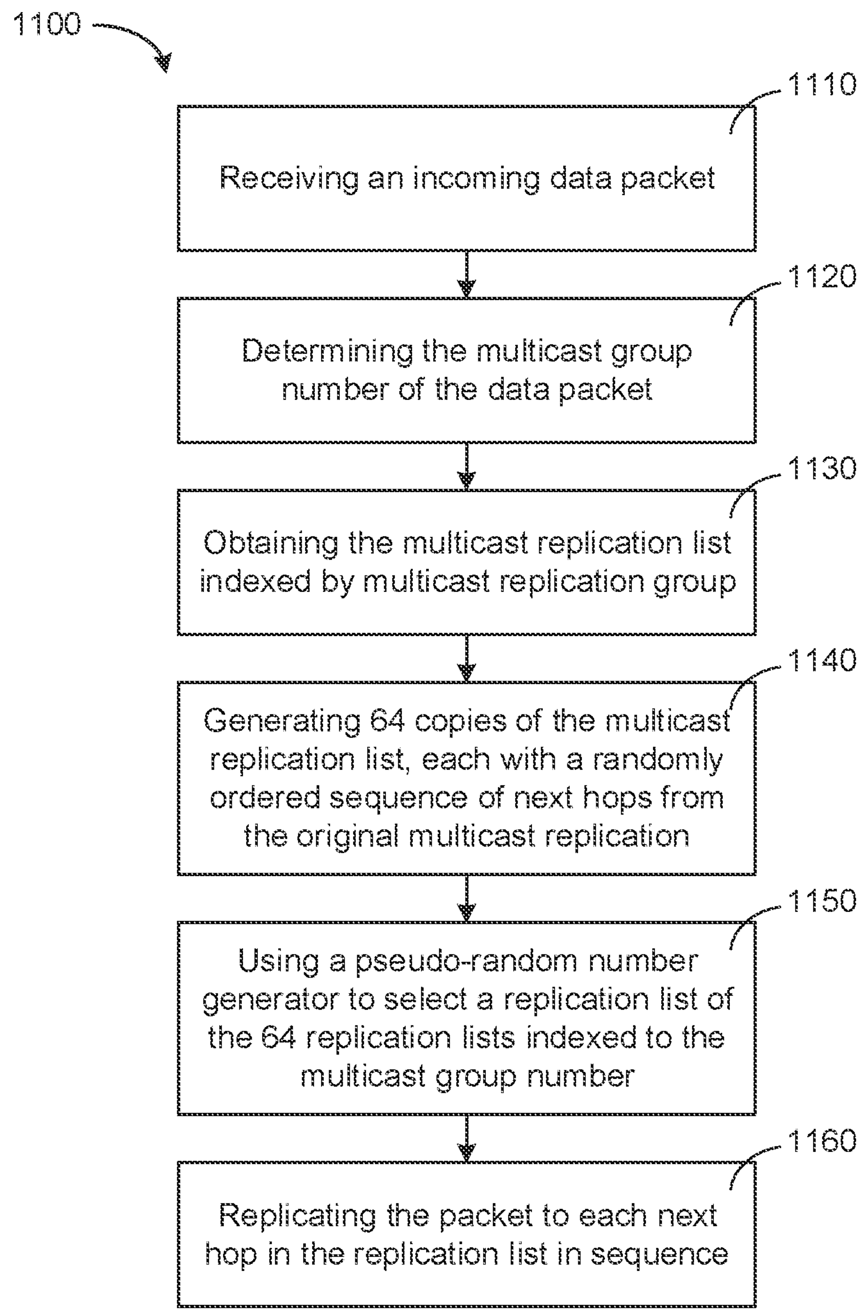
FIG. 11 is a flow chart depicting one example of the method of reducing bias in L3 multicast replication shown in FIG. 10.

FIG. 11 is a flow chart illustrating process 1100 according to a specific embodiment. Process 1100 can be performed by one or more network devices. For example, process 1100 can be performed by network switch 10 and/or hardware contained within it such as an ASIC chip. Process 1100 can be similar and/or identical to process 1000. Step 1110 includes receiving an incoming data packet, and step 1120 includes determining the multicast group the data packet belongs to. In some embodiments, step 1110 is performed later, and the multicast group is selected from a list of multicast groups, for example, as shown in process 1000. After the multicast group is determining, step 1130 includes obtaining the multicast replication list indexed by multicast replication group number. Using the replication list, step 1140 includes generating 64 copies of the replication list, each with a randomly ordered sequence of next hops. While shown as 64 copies, any number of replication list copies may be created. As discussed above, the replication lists may include next hops and/or port bitmaps belonging to the multicast group number. Using a pseudo-random number generator, step 1150 includes randomly selecting one of the 64 replication list copies corresponding to the multicast group number, and step 1060 includes replicating the packet to each next hop in the replication list.

Figure 12:
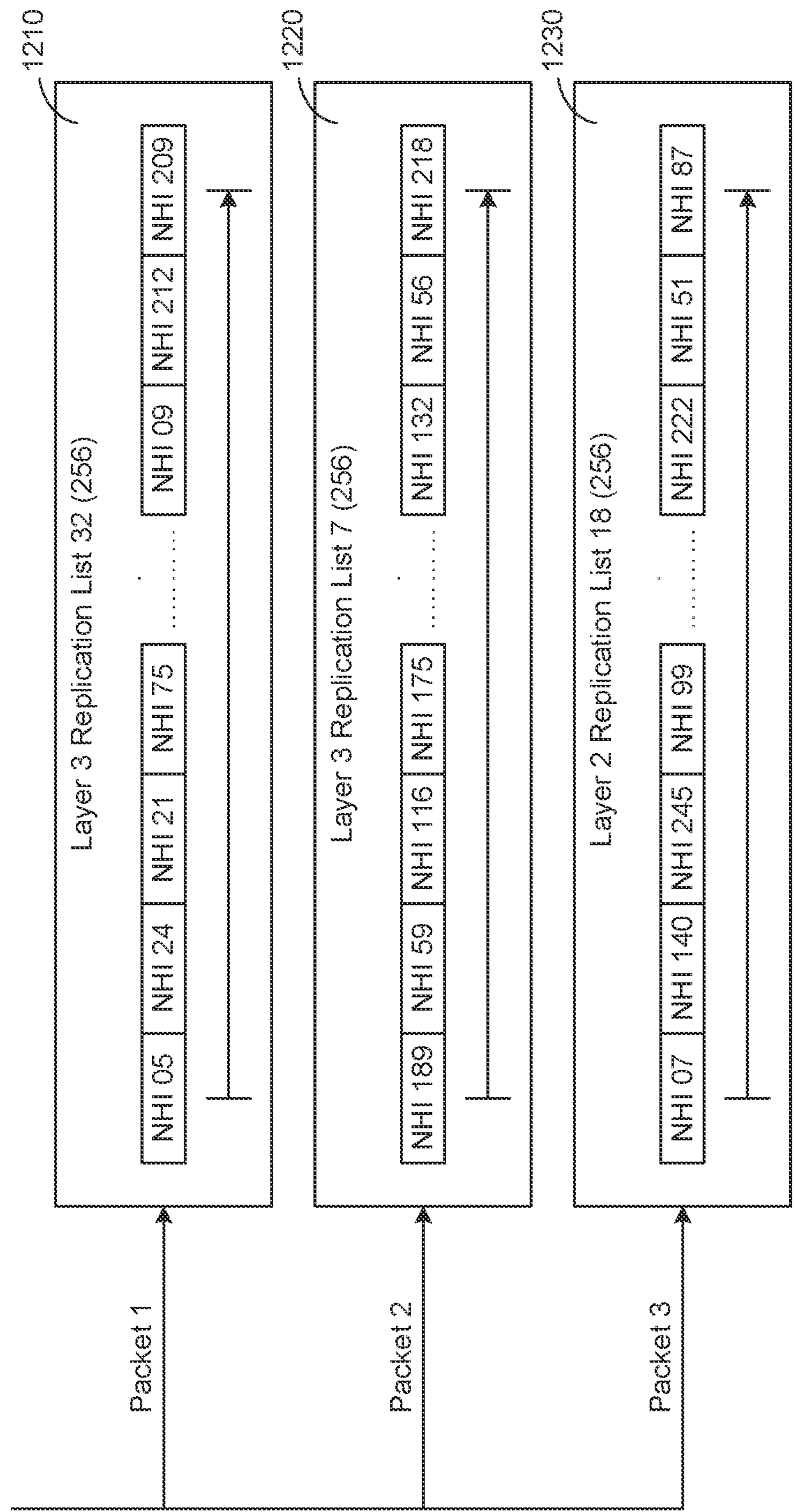
FIG. 12 depicts packet handling according to the method shown in FIG. 10.

FIG. 12 is an example of packet processing for processes 1000 and 1100 after the replication lists have been copied, according to an exemplary embodiment. Packet 1 is shown being replicated according to the order of destinations in replication list 1210, shown as Layer 3 Replication List 32. Replication list 1210 is shown to include 256 next hops, though it should be understood that the replication lists may be of any length, so long as each list copy has the same destinations as the others. As shown, the order of next hops in replication list 1210 is random. For every packet in the multicast group, another replication list is randomly selected. For example, packet 2 is shown being replicated according to replication list 1220, shown as Layer 3 Replication List 7, and packet 3 is shown being replicated according to replication list 1230, shown as Layer 3 Replication List 18. Because different packets in the same multicast group are replicated according to randomly selected replication lists corresponding to the replication group, the short-term bias in L3 replication is reduced.

Figure 13:
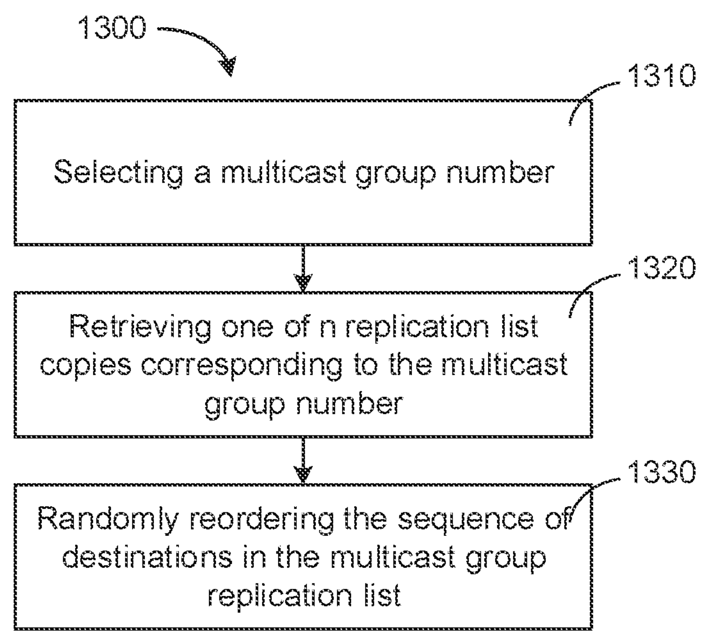
FIG. 13 is a flow chart illustrating a second method of reducing bias in L3 multicast replication, according to an exemplary embodiment.

In some embodiments, further steps can be taken to reduce long-term bias in L3 packet switching. Long-term bias results from the fact that the replication list copies are static. For example, after the replication list copies are created and the order of destinations in each is randomly reordered, it is possible that next hop 221 is always before next hop 12. Because the lists are static, no matter which list is chosen next hop 221 will have a bias as compared to next hop 12. Referring now to FIG. 13, an update process 1300 is shown that can be performed in addition to processes 1100 and 1200 to reduce long term bias in L3 replication, according to an exemplary embodiment. Process 1300 can be performed by one or more network devices. For example, process 1300 can be performed by network switch 10 and/or hardware contained within it such as an ASIC chip. In process 1300, a multicast group number is selected by the network switch in step 1310, and one of n pre-existing replication list copies corresponding to the multicast group is retrieved in step 1320. In some embodiments, the replication list is randomly selected using a pseudo-random number generator. In some embodiments, the replication list is selected according to a schedule. For example, software within a network switch may be configured to sequentially select replication list copies to ensure that each is periodically updated. Step 1330 includes randomly reordering the sequence of destinations in the replication list. In some embodiments, step 1330 is similar to step 1140 of process 1100, in that the order of the destinations in the copies are randomly ordered. Process 1300 may be periodically initiated within a network switch to eliminate long-term bias. In some embodiments, process 1300 is triggered by a multicast packet arriving for the selected multicast group. In some embodiments, multicast groups are updated according to process 1300 randomly.

Network Switch

Figure 14:
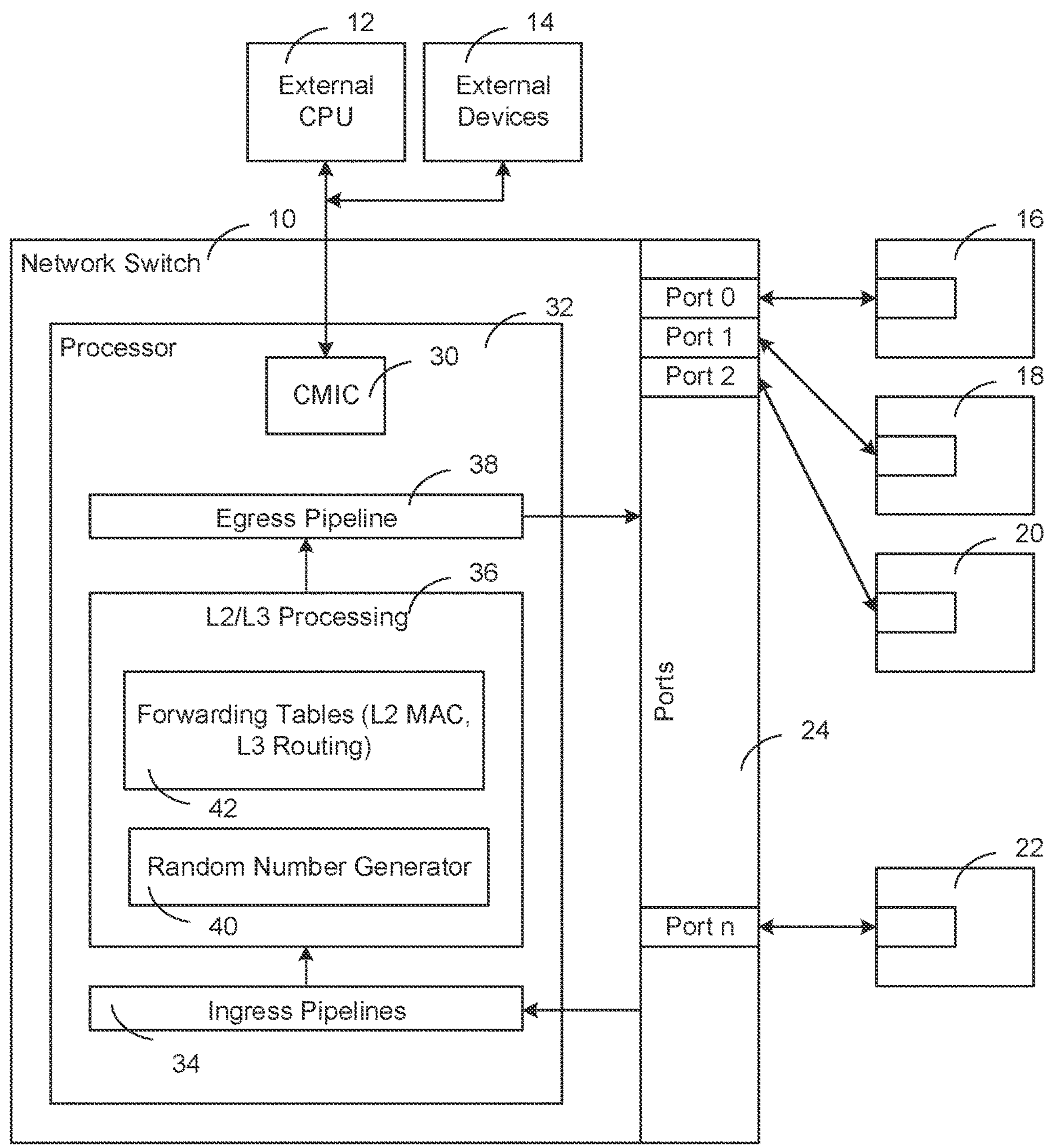
FIG. 14 is a block diagram of a network switch, according to an exemplary embodiment.

FIG. 14 is a detailed block diagram of a network switch 10 shown in FIG. 1, according to the present invention. The network switch 10 is shown to include CPU Management Input Controller (CMIC) 30. In some embodiments, CMIC 30 includes 4 PCIe ports. CMIC 30 allows network switch 10 to connect to CPU 12 which can be used to access network switch 10 and program processor 32. Processor 32 can be used to program and control the network switch 10 including L2/L3 processing 36. Processor 32 is any logic circuitry that responds to and processes instructions fetched from the memory. In some embodiments, processor 32 is an application-specific integrated circuit (ASIC). Processor 32 enables wire or line speed communication between its various internal modules and ports 24. Processor 32 may also be a field programmable gate array (FPGA) or any other type and form of dedicated silicon logic or processing circuitry.

L2/L3 Processing 36 is connected to ports 24 by ingress pipeline 34 and egress pipeline 38. Ports 24 may be fast Ethernet ports, gigabit Ethernet ports, management ports, Direct Attach Copper (DAC) ports, and/or PCIe ports or other common ports depending on the application. For example, ports 24 may include 256 gigabit Ethernet ports. It should be noted that any number of ports can be provided and additional interconnects for external devices 14 may be provided as necessary. Ports 24 can receive a packet at a network switch 10 from network device(s) 16, 18, 20, and/or 22 and pass the packet to processor 32. The packet can be passed by ingress pipeline 34 to L2/L3 processing 36 for replication and forwarding. Ingress pipeline 34 may include parsers and other tiles for packet processing. The packet is passed to L2/L3 processing 36 which passes the processed and/or replicated packets to egress pipeline 38 to finally forward the packets through ports 24 to the appropriate network device(s) 16, 18, 20, and 22. The present invention can accommodate various types of data, and "packet" can include packet, cell, frame, datagram, bridge protocol data unit packet, packet data, etc.

FIG. 14 illustrates that L2/L3 Processing 36 includes random number generator 40 and forwarding tables 42. Random number generator 40 may be any type of random number generator that can produce random or pseudo-random numbers including non-deterministic random number generators and deterministic or pseudo-random number generators. Random number generator 40 may be implemented in software or included as a hardware component. Forwarding tables 42 may include L2 destination lists indexed to multicast group numbers, such as L2 MAC address tables for L2 switching. L2 switching forwards packets intra-network. Forwarding tables 42 may also include L3 IP routing tables for L3 switching or routing, which forwards packets inter-network and may include linked lists. Packet forwarding and processing using random number generator 40 and forwarding tables 42 is explained in detail above. Forwarding tables 40 may contain destination lists and/or replication lists, such as the port bitmap vectors for L2 switching and the linked lists for L3 switching.

Network switch 10 may also include other components not shown. For example network switch 10 may include Ethernet port interface controllers, gigabit port interface controllers, internet port interface controllers, a buffer, and a memory management unit.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in port or destination quantity, data types, methods of randomization or pseudo-randomization, values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (i.e., ASICs or FPGAs) or any other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A method of reducing bias in multicast replication, the method comprising:

receiving a packet at a network device;

determining a multicast group from the packet;

selecting from a plurality of pre-existing replication lists, a replication list for the multicast group, wherein the replication list defines an order for replication of at least two or more destinations corresponding to the multicast group;

generating a plurality of copies of the replication list;

selecting in a randomized fashion one of the copies of the replication list;

replicating the packet for the at least two or more destinations according to the one of the copies of the replication list; and forwarding the replicated packet to the at least two or more destinations.

2. The method of claim 1, wherein the at least two or more destinations are one or more egress ports of the network device.

3. The method of claim 2, wherein the one of the copies comprises a port bitmap that corresponds to the multicast group, wherein the port bitmap is a listing of ports of the network device belonging to the multicast group.

4. The method of claim 3, wherein forwarding the replicated packet to the at least two or more destinations comprises:

randomly selecting an initial destination in the port bitmap, wherein the port bitmap is a circularized bit vector; and forwarding the replicated packet according to the port bitmap, starting at the initial destination until the replicated packet has been forwarded to each port in the port bitmap.

5. The method of claim 3, wherein forwarding the replicated packet to the at least two or more destinations comprises:

dividing the port bitmap into one or more replication groups, wherein the one or more replication groups contain a subset of ports of the port bitmap;

randomly selecting a first replication group; and forwarding the replicated packet according to the first replication group.

6. The method of claim 5, further comprising the steps of:

randomly selecting a second replication group; and forwarding the replicated packet according to the second replication group.

7. The method of claim 5, further comprising the steps of:

randomly selecting an initial destination in the first replication group, wherein the first replication group is a circularized bit vector; and forwarding the replicated packet according to the first replication group starting at the initial destination.

8. The method of claim 5, further comprising the steps of randomly reordering the listing of ports in the port bitmap, wherein dividing the port bitmap into the one or more replication groups comprises dividing the reordered port bitmap into the one or more replication groups.

9. The method of claim 1, wherein obtaining the at least two or more destinations are into an IP routing table to obtain a linked list of destinations corresponding to the multicast group, and wherein forwarding the replicated packet to the at least two or more destinations comprises forwarding the replicated packet according to the linked list.

10. The method of claim 9, wherein the linked list is randomly selected from a plurality of linked list copies corresponding to the multicast group, wherein the plurality of linked list copies are generated from a first linked list corresponding to the multicast group comprising a listing of next hops, and wherein the listing of next hops is randomly reordered in each of the plurality of linked list copies.

11. The method of claim 10, further comprising the steps of:

periodically selecting a linked list copy from the plurality of linked list copies; and randomly reordering the listing of next hops in the selected linked list copy.

12. The method of claim 1, wherein obtaining the at least two or more destinations comprises:

indexing the multicast group into a lookup table to obtain a port bitmap that corresponds to the multicast group, wherein the port bitmap is a listing of ports of the network device belong to the multicast group;

indexing the multicast group into an IP routing table to obtain a linked list of destinations corresponding to a multicast group number, wherein the linked list is randomly selected from a plurality of linked list copies corresponding to the multicast group, wherein the plurality of linked list copies are generated from a first linked list corresponding to the multicast group comprising a listing of next hops, and wherein the listing of next hops is randomly reordered in each of the plurality of linked list copies; and wherein forwarding the replicated packet to the at least two or more destinations comprises:

dividing the port bitmap into one or more replication groups, wherein the one or more replication groups contain a subset of ports of the port bitmap;

randomly selecting a first replication group;

forwarding the replicated packet to according to the first replication group; and forwarding the replicated packet according to the linked list.

13. A network device for forwarding packets, comprising:

an ingress port configured to receive at least a first data packet;

a forwarder configured to:

receiving a packet at a network device;

determine a multicast group from the packet;

select from a plurality of pre-existing replication lists, a replication list for the multicast group, wherein the replication list defines an order for replication of at least two or more destinations corresponding to the multicast group;

generate a plurality of copies of the replication list;

selecting in a randomized fashion one of the copies of the replication list;

replicate the packet for the at least two or more destinations according to the one of the copies of the replication list; and forward the replicated packet to the at least two or more destinations determine a multicast group from the first data packet.

14. The network device of claim 13, wherein the at least two or more destinations comprise a port bitmap corresponding to the multicast group obtained from a lookup table, wherein the port bitmap is a listing of ports of the network device belonging to the multicast group.

15. The network device of claim 14, wherein the forwarder is configured to divide the port bitmap into one or more replication groups, wherein the one or more replication groups contain a subset of ports of the port bitmap, randomly selecting a first replication group, and forwarding the replicated packet according to the first replication group.

16. The network device of claim 13, wherein the forwarder is configured to index the multicast group into an IP routing table to obtain the at least two or more destinations, wherein the at least two or more destinations comprise a linked list corresponding to the multicast group, and the forwarder is further configured to forward the replicated packet according to the linked list.

17. The network device of claim 16, wherein the forwarder is further configured to:

randomly select the linked list from a plurality of linked list copies corresponding to the multicast group, wherein the plurality of linked list copies are generated from a first linked list corresponding to the multicast group comprising a listing of next hops, and wherein the listing of next hops is randomly reordered in each of the plurality of linked list copies;

periodically select a linked list from the plurality of linked list copies; and randomly reorder a listing of next hops in the selected linked list copy.

18. A method of reducing bias in multicast replication, the method comprising:

receiving a packet at a network device;

determining a multicast group from the packet;

selecting from a plurality of pre-existing replication lists, a replication list for the multicast group, wherein the replication list defines an order for replication of at least two or more destinations corresponding to the multicast group wherein the list comprises a port bitmap that corresponds to the multicast group, wherein the port bitmap is a listing of ports of the network device belonging to the multicast group;

generating a plurality of copies of the replication list;

selecting in a randomized fashion one of the copies of the replication list;

replicating the packet for the at least two or more destinations according to the one of the copies of the replication list; and forwarding the replicated packet to the at least two or more destinations.

19. The method of claim 18, wherein the method is performed by an integrated circuit.

20. The method of claim 18, wherein the port bitmap is a circularized bit vector.

* * * * *